United States Patent [19]

Burack et al.

[11] Patent Number: 4,532,396
[45] Date of Patent: Jul. 30, 1985

[54] FLEXIBLE INDUCTION BRAZING WAND FOR HOLLOW TUBES

[75] Inventors: Robert D. Burack, Pleasant Hills; Thomas J. Saska, Lower Burrell, both of Pa.

[73] Assignee: Westinghouse Electric Corp., Pittsburgh, Pa.

[21] Appl. No.: 387,297

[22] Filed: Jun. 10, 1982

[51] Int. Cl.³ .............................................. H05B 6/38
[52] U.S. Cl. ......................... 219/10.49 R; 219/10.75; 219/10.57; 219/10.79; 174/15 WF
[58] Field of Search ............... 219/10.79, 10.75, 10.43, 219/10.57, 10.49 R, 8.5, 7.5, 10.51, 85 A, 9.5; 174/15 WF

[56] References Cited

U.S. PATENT DOCUMENTS

| | | |
|---|---|---|
| 1,986,636 | 1/1935 | Holinger . |
| 2,397,442 | 3/1946 | Somes ................................. 219/10.79 |
| 2,501,417 | 3/1950 | Smits et al. . |
| 2,510,942 | 6/1950 | Albertson, Jr. ................... 219/10.79 |
| 2,556,236 | 6/1951 | Strickland, Jr. . |
| 2,759,085 | 8/1956 | Van Iperen ....................... 219/10.41 |
| 3,022,368 | 2/1962 | Miller ............................. 174/15 WF |
| 3,076,884 | 2/1963 | Crawford .......................... 219/10.79 |
| 3,119,917 | 1/1964 | Dehn ................................. 219/10.79 |
| 3,182,170 | 5/1965 | Rolfes ................................ 219/10.79 |
| 3,389,238 | 6/1968 | Shaw ...................................... 219/9.5 |
| 3,492,453 | 1/1970 | Hurst ............................. 219/10.49 R |
| 3,534,198 | 10/1970 | Miller ............................. 174/15 WF |
| 3,590,201 | 6/1971 | Basinger ............................... 219/8.5 |
| 4,006,337 | 2/1977 | Maxim .................................. 219/8.5 |

FOREIGN PATENT DOCUMENTS 47410  3/1982  European Pat. Off. .

OTHER PUBLICATIONS

"Sleeving Saves Nuclear Steam Generator Tubes", by F. C. Olds, Power Engineering, Dec. 1981.

Primary Examiner—Philip H. Leung
Attorney, Agent, or Firm—L. A. DePaul

[57] ABSTRACT

The brazing wand comprises a hollow helically wound electrically conductive tubular member for conducting an electrical current and for conducting a coolant therethrough. The electrical current is used to heat a member to be brazed while the coolant is used to control the temperature of the brazing wand. The brazing wand also comprises a flexible cable for conducting the electrical current and coolant to the heating portion of the wand.

13 Claims, 5 Drawing Figures

FLEXIBLE INDUCTION BRAZING WAND FOR HOLLOW TUBES

BACKGROUND OF THE INVENTION

This invention relates to heating apparatus and more particularly to heating apparatus for attaching a sleeve within a tube by a brazing procedure.

In tube-type heat exchangers, a first fluid flows through the tubes of the heat exchanger while a second fluid surrounds the outside of the tubes such that heat exchange occurs between the two fluids. Occasionally, one of the tubes can become defective such that a leak occurs therein which allows the fluids to mingle. When this occurs, it is sometimes necessary to either plug the tube so that the fluid does not flow through the tube or repair the tube, thereby preventing leakage from the tube.

In nuclear reactor power plants, the tube-type heat exchangers are commonly referred to as steam generators. When a defect occurs in a tube of a nuclear steam generator that allows the coolant in the tube to mingle with the coolant outside of the tube, a more significant problem arises. Not only does this situation create an ineffective heat exchanger, but it also creates a radioactive contamination problem. Since the fluid flowing in the tubes of a nuclear steam generator is generally radioactive, it is important that it not be allowed to leak from the tubes and contaminate the fluid surrounding the tubes. Therefore, when a leak occurs in a nuclear steam generator heat exchange tube, the heat exchange tube must either be plugged or repaired so that the coolant does not leak from the tube. This prevents contamination of the fluid surrounding the tubes.

There are several methods known in the art for repairing heat exchange tubes, however, many of these methods are not applicable to repair of heat exchange tubes wherein the tube is not readily accessible. For example, in a nuclear steam generator the physical inaccessibility of defective heat exchange tubes and the radioactive nature of the environment surrounding the heat exchange tubes presents unique problems to repairing heat exchange tubes that do not normally exist in other heat exchangers. For these reasons, special methods have been developed for repairing heat exchange tubes in nuclear steam generators. Typically, the method used to repair a heat exchange tube in a nuclear steam generator is one in which a metal sleeve having an outside diameter slightly smaller than the inside diameter of the defective tube is inserted into the defective tube and attached to the defective tube to bridge the defective area of the tube. This type of repair method is generally referred to as "sleeving". Previous sleeving development work has been concerned with obtaining a relatively leakproof joint between the sleeve and the tube by brazing, arc welding, explosive welding, or other joining means. Due to the need for cleanliness, close fittings, heat application, and atmospheric control, these metallurgical bonding techniques have problems which are not easily solvable in areas such as nuclear steam generators where human access is limited.

In the braze sleeving methods such as the one described in U.S. Patent Application Ser. No. 185,654, filed Sept. 9, 1980 in the name of R. D. Burack and entitled "Braze Sleeving Method" which is assigned to the Westinghouse Electric Corporation, it is necessary to heat the braze material in order to form the braze bond between the sleeve and the tube. One way to heat the braze material is by inserting a heating apparatus in the sleeve so as to internally heat the sleeve and the braze material. However, due to the inaccessibility of the work area, the power requirements for the heating apparatus, and the need to carefully control the brazing times and temperatures, a specially designed internal brazing wand is recommended for use in such a process. Moreover, due to the limited access available in certain areas of a nuclear steam generator, it is desirable that the brazing wand be flexible so as to be able to negotiate close working areas while being sufficiently long to be able to be extended into the heat exchange tube to the desired location.

Therefore, what is needed is a flexible brazing wand capable of being inserted in a heat exchange tube for precisely controlling the temperature and time of the brazing process.

SUMMARY OF THE INVENTION

The flexible brazing wand comprises a hollow helically wound electrically conductive tubular member for conducting an electrical current and for conducting a coolant therethrough. The electrical current is used to heat a member to be brazed while the coolant is used to control the temperature of the brazing wand. The brazing wand also comprises a flexible cable for conducting the electrical current and coolant to the heating portion of the wand.

BRIEF DESCRIPTION OF THE DRAWINGS

While the specification concludes with claims particularly pointing out and distinctly claiming the subject matter of the invention, it is believed the invention will be better understood from the following description, taken in conjunction with the accompanying drawings, wherein:

DESCRIPTION OF THE PREFERRED EMBODIMENTS

Brazing of sleeves in heat exchange tubes may require the use of a flexible internal heating apparatus capable of reaching tubes where access is limited. The invention described herein is a flexible brazing wand capable of being flexed so as to be inserted in heat exchange tubes having a limited area for insertion for brazing sleeves in those tubes.

Figure 1:
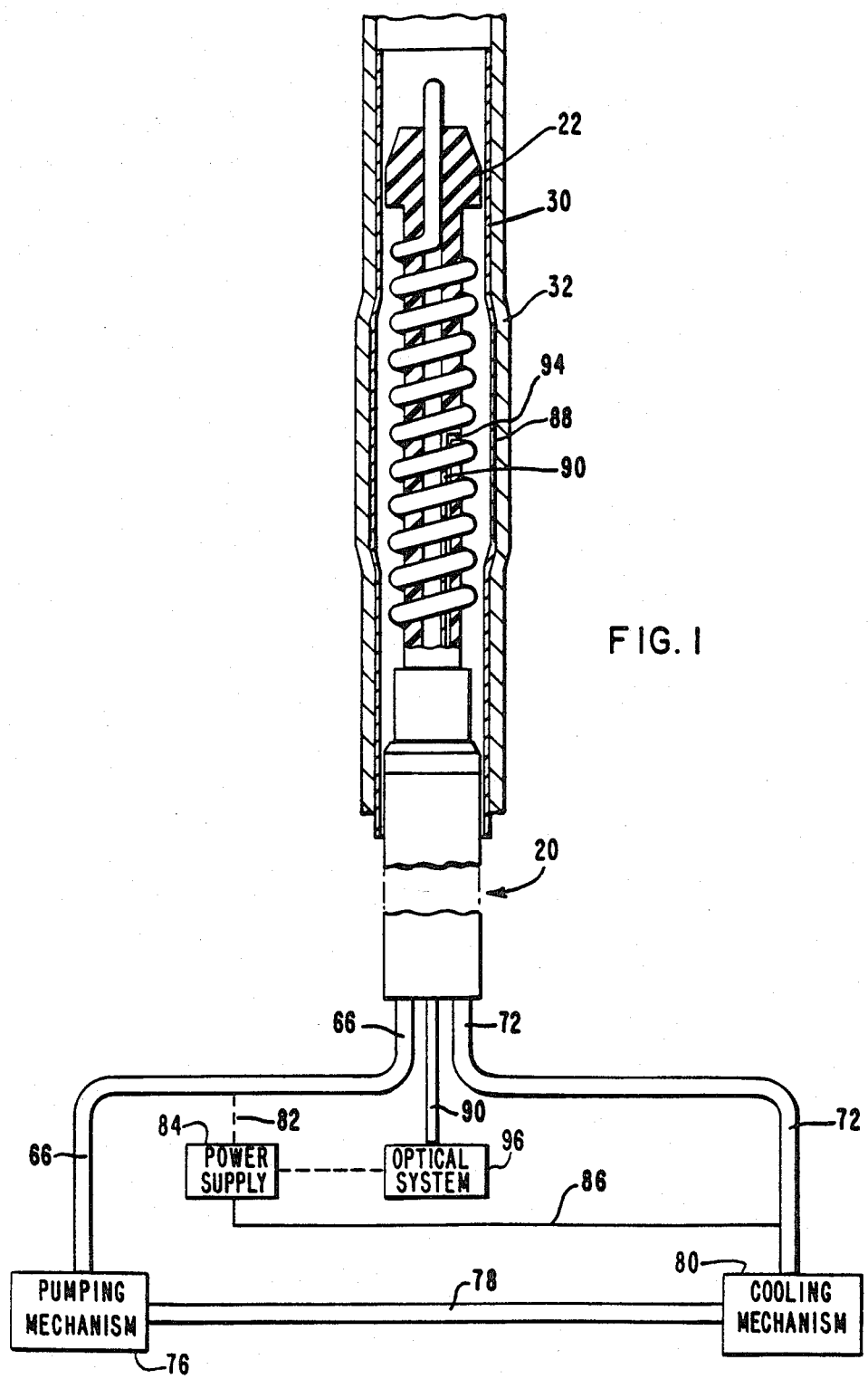
FIG. 1 is a cross-sectional view in elevation of the brazing wand disposed in a tube.
Figure 2:
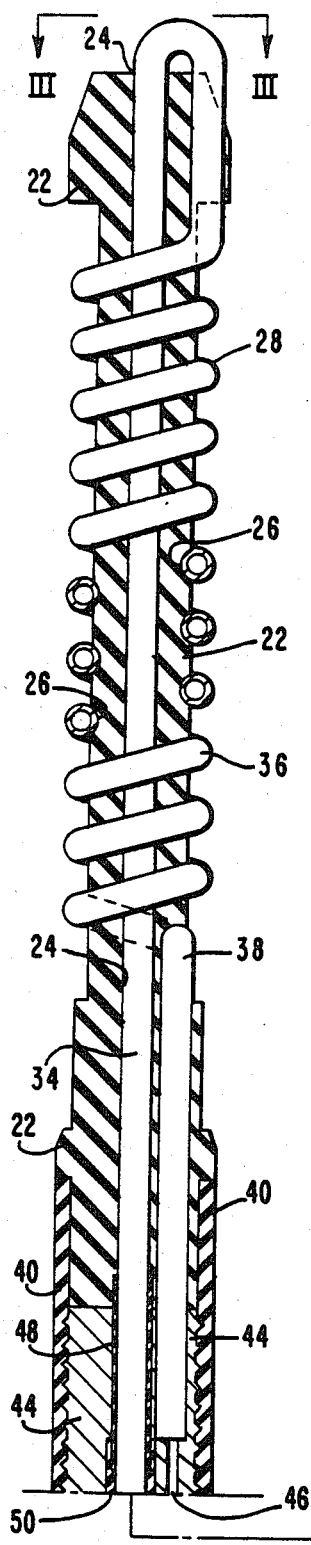
FIG. 2 is a partial cross-sectional view in elevation of the brazing wand.
Figure 2:
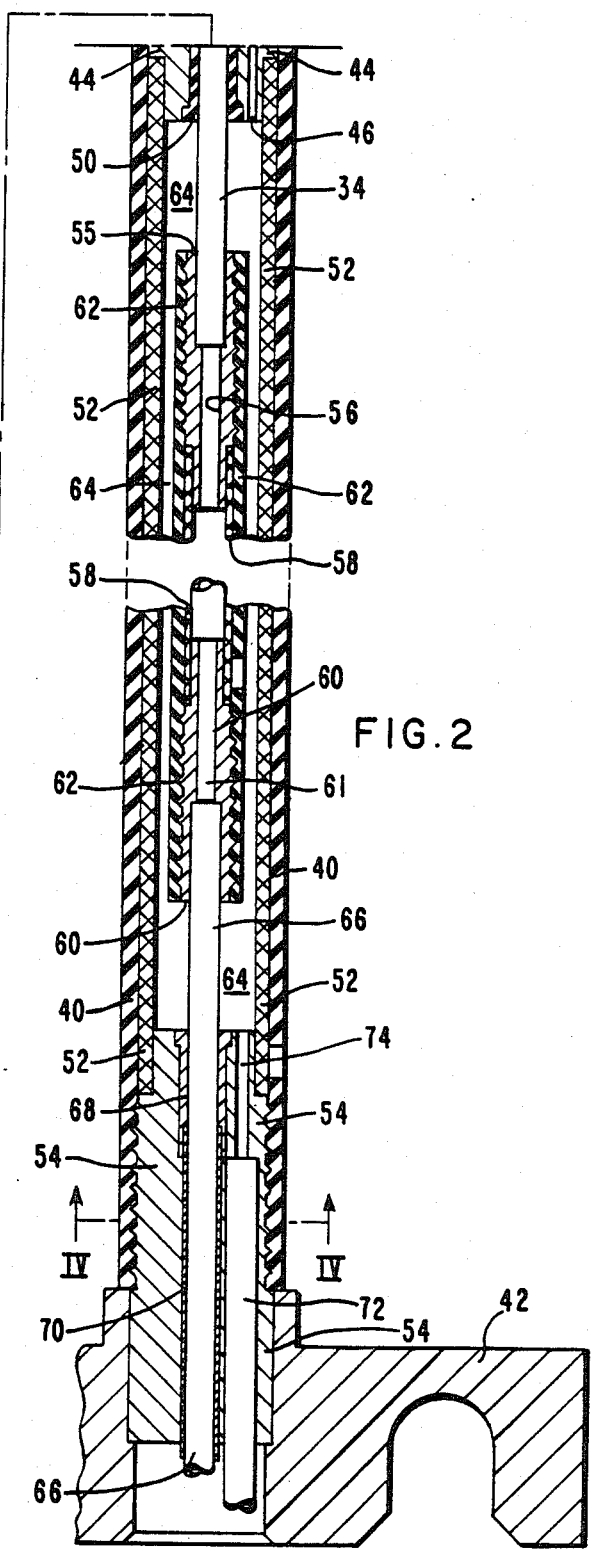
Figure 3:
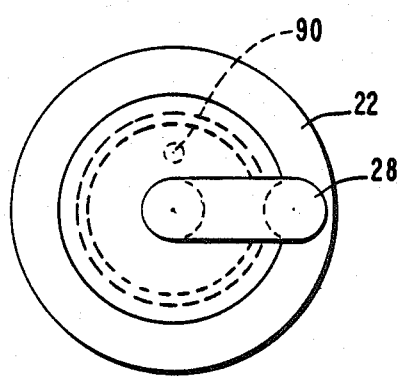
FIG. 3 is a view along line III—III of FIG. 2.

Referring to FIGS. 1, 2 and 3, the flexible brazing wand is referred to generally as 20 and comprises a coil mandrel 22 which may be made of a high temperature insulating material such as vespel and formed with a center bore 24 extending the entire length thereof. Coil mandrel 22 is also formed to have a plurality of grooves 26 on the outside surface thereof for accommodating coil 28. Coil mandrel 22 serves to support and protect coil 28 so that coil 28 may be inserted into a metal sleeve 30 of a metal tube 32.

Coil 28 which may be an electrically conductive copper tube having a 0.125 inch outside diameter and capable of conducting a fluid therethrough is mounted on coil mandrel 22. Coil 28 may be formed to have a substantially straight first leg 34 disposed in center bore 24 of coil mandrel 22 and to have a helically wound coil portion 36 disposed around the outside of coil mandrel 22 and in grooves 26 of coil mandrel 22. Coil 28 is also formed to have a substantially straight second leg 38 at the other end of coil portion 36 and disposed in coil mandrel 22. Generally, coil 28 is a continuous tubular member formed as described above for conducting a cooling fluid therethrough such as water and capable of conducting an electrical current through the metal portion thereof. Coil portion 36 of coil 28 may be constructed to be long enough to extend beyond the area to be brazed so as to effectively heat that area. Typically, coil portion 36 may be approximately 2-5 inches in length, 0.45 inches in diameter, and may have approximately 5-25 turns. Preferably, coil portion 36 should have approximately 11 turns.

Figure 4:
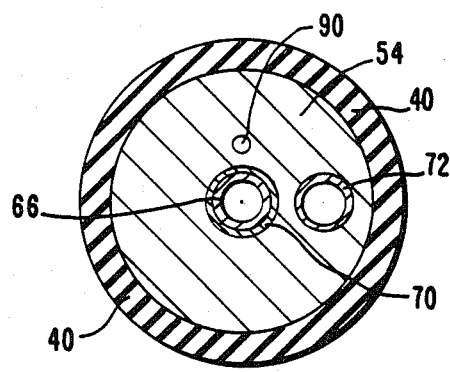
FIG. 4 is a view along line IV—IV of FIG. 2.

Referring now to FIGS. 2 and 4, a flexible first nylon tube 40 is attached to the lower end of coil mandrel 22 and extends to support member 42. A copper first member 44 is attached to and disposed in first nylon tube 40 adjacent the lower end of coil mandrel 22 with first leg 34 and second leg 38 disposed therein. First member 44 also has a first channel 46 disposed therethrough in fluid communication with second leg 38. A first insulating sleeve 48 which may be a polyolefin tube and a first nylon insert 50 may be disposed over a portion of first leg 34 which is disposed through first member 44 for electrically insulating first leg 34 from second leg 38.

A substantially tubular copper braided first conductor 52 is disposed in first nylon tube 40 and attached at one end to first member 44 and at the other end to a copper second member 54 for conducting an electrical current between first member 44 and second member 54. First conductor 52 is constructed to be a flexible conductor so as to be able to conduct electricity to coil 28 while being flexible enough to allow maneuvering of first nylon tube 40 so that coil 28 may be inserted into difficult to reach tubes 32.

First leg 34 extends through nylon insert 50 and is attached at its lower end to a copper third member 55 having a bore 56 extending therethrough in fluid communication with first leg 34. A flexible substantially tubular copper braided second conductor 58 is attached at one end to third member 55 and is attached at its other end to a copper fourth member 60 having a bore 61 therein for conducting an electrical current between third member 55 and fourth member 60 while allowing a fluid such as water to be conducted through it. A second nylon tube 62 is attached to and disposed over third member 55, second conductor 58 and fourth member 60 for electrically insulating third member 55, fourth member 60, and second conductor 58 from first conductor 52 while preventing leakage of fluid from second conductor 58. Second nylon tube 62 is also disposed within first conductor 52 and defines a passageway 64 therebetween which is in fluid communication with channel 46. The construction of second conductor 58 and second nylon tube 62 provides a flexible means by which electricity and a cooling fluid may be conducted through coil 28 while allowing flexible maneuvering of brazing wand 20. It also provides a coax cable which prevents parallel lead power dissipation and thus permits RF power to be transmitted to the coil.

Still referring to FIGS. 2 and 4, a tubular copper first conduit 66 is attached to the lower end of fourth member 60 and extends through second member 54 for conducting a fluid therethrough and isolating the fluid from passageway 64. A second insulating sleeve 68 which may be a polyolefin tube and a second nylon insert 70 may be disposed over a portion of first conduit 66 which is disposed through second member 54 for electrically isolating first conduit 66 from a tubular copper second conduit 72 which is also disposed in second member 54. In addition, a second channel 74 is located in second member 54 in fluid communication with passageway 64 and second conduit 72. Second member 54 is also attached to support member 42 which may be used to support flexible brazing wand 20.

Referring now to FIGS. 1 and 2, first conduit 66 is connected to pumping mechanism 76 which may be a water pump capable of pumping a coolant such as water at a rate of about 0.25-0.75 gal./min. and at a pressure of about 180-220 psi. Preferably, the coolant is pumped at about 0.5 gal./min. and at about 200 psi. Pumping mechanism 76 which may be located approximately 20 ft. from flexible brazing wand 20 is connected by a third conduit 78 to cooling mechanism 80 with cooling mechanism 80 being connected to second conduit 72 thereby completing a closed coolant flow system. Cooling mechanism 80 may be a freon type refrigeration unit and is capable of maintaining the coolant between approximately 50°-100° F. and preferably at about 70° F. Of course, the flow of coolant through the system may be in either direction as long as the coolant acts to maintain coil 28 at a reasonable temperature which is generally about 100° F. The cooling system thereby provides a system for pumping a coolant through coil 28 to maintain the temperature of coil 28 at a reasonable level.

A power lead 82 is connected to first conduit 66 and to power supply 84 and power lead 86 is connected to second conduit 72 and to power supply 84 thereby completing the power circuit for flexible brazing wand 20. Power supply 84 may be a 20 KW RF induction heating power supply capable of operating between 200-400 KHz and preferably at about 250 KHz. Power supply 84 may be chosen from those well known in the art or it may be a modified compact power supply suitable for use at remote locations. In this manner, an electrical current, dissipating approximately 7 KW, flows through coil 28 so as to establish a magnetic field around coil portion 36 for inducing an electrical current in a member to be brazed thereby heating the member such as sleeve 30 and braze material 88 disposed between sleeve 30 and tube 32.

Figure 5:
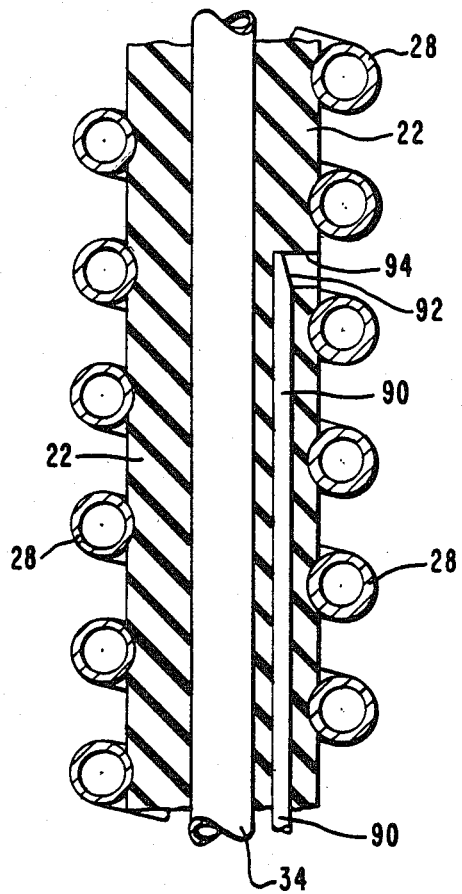
FIG. 5 is an enlarged view in cross-section of the brazing wand coil.

Referring now to FIGS. 1 and 5, an optical cable 90 which may be a 0.6 mm. diameter single strand quartz fiber optic cable is disposed inside coil 28 and in coil mandrel 22 for viewing the light generated by the heating of sleeve 30. Optical cable 90 has a tip 92 which is located approximately midway along the length of coil 28 and is ground at a 45° angle so as to act as a prism to reflect the light along optical cable 90. In addition, coil mandrel 22 may have a bore 94 therein in alignment with tip 92 for conducting light to tip 92.

Optical cable 90 is connected to optical system 96 for detecting the light produced by heating sleeve 30 and thus determining the temperature of sleeve 30. Optical system 96 may also be connected to power supply 84 for automatically adjusting the power of coil 28 to achieve the desired brazing temperature. Optical system 96 may also have a digital display of temperature to enable manual temperature manipulation. Optical system 96 may include a two color pyrometer chosen from those well known in the art, modified to accept a fiber optic input, and is selected because it is not light intensity dependent. Therefore, light intensity variations due to clouding of the optical system will not create temperature variations in optical system's 96 readings. An optical system of this type is capable of sensing temperatures in the range of 1300° F. to 2600° F. while coil 28 is capable of generating temperatures in sleeve 30 of up to 2500° F.

The flexible brazing wand 20 thereby provides a means to heat brazing material 88 for the purpose of brazing sleeve 30 to tube 32. In the operation of flexible brazing wand 20, an electrical current is generated by power supply 84 and conducted through power lead 82 and first conduit 66. The current is also conducted through fourth member 60 and through second conductor 58. Since second conductor 58 is connected to third member 55, the current is also conducted through third member 55 which is also connected to first leg 34 of coil 28. From first leg 34, the current is conducted through coil portion 36 and through second leg 38. Second leg 38 is connected to first member 44 which is connected to first conductor 52 which allows the current to be conducted from second leg 38 through first conductor 52 to second member 54. Since second conduit 72 is disposed in second member 54, the electrical current can be passed from first conductor 52 through second member 54 to second conduit 72 and through power lead 86 to power supply 84 thereby completing the electrical circuit.

Similarly, a coolant such as water may be pumped by pumping mechanism 76 through first conduit 66 and through bores 61 and 56 and into first leg 34. From first leg 34, the coolant may be conducted through coil portion 36 and through second leg 38. From second leg 38 the coolant enters first channel 46 and flows through passageway 64 and through second channel 74 into second conduit 72 and through cooling mechanism 80 and third conduit 78 thereby completing the coolant flow path.

When it is desired to braze a sleeve 30 to the inside of a heat exchange tube 32, a sleeve 30 with braze material 80 thereon is inserted into tube 32 and sleeve 30 is internally expanded into close contact with tube 32. Then flexible brazing wand 20 is inserted into sleeve 30 so that coil 28 spans the joint to be brazed as shown in FIG. 1. Power supply 84 is then set to the desired power level to produce the desired temperature cycle in the braze material and sleeve 30. Pumping mechanism 76 is also activated which causes the coolant to flow through coil 28. The electrical current flowing through coil 28 establishes a magnetic field around coil 28 which induces an electrical current in sleeve 30 thereby generating heat in sleeve 30 in the area to be brazed. The heat produces light which is sensed by optical cable 90 and relayed to optical system 96 which determines the temperature of sleeve 30. This information is continuously relayed to power supply 84 to continuously adjust the power level to achieve the preprogrammed brazing cycle. The brazing temperature is held for the proper time interval thus completing the brazing process. When complete, flexible brazing wand 20 is deactivated and removed from sleeve 30.

Therefore, the invention provides a flexible brazing wand capable of being inserted in difficult to reach heat exchange tubes for precisely controlling the temperature and time of the brazing process.

We claim as our invention:

1. Internal heating apparatus comprising:
   a mandrel capable of being disposed in a tube;
   a hollow electrically conductive tubular member mounted on said mandrel and capable of conducting a fluid therethrough, said tubular member having a substantially straight leg and having a portion thereof helically wound around a portion of said mandrel forming an induction coil for heating said tube;
   an electrically insulating flexible first cable having a first end and a second end with said first end attached to said mandrel;
   an electrically conductive first member having a channel therethrough for conducting a coolant and disposed within said first cable and connected to said mandrel and connected to said tubular member;
   an electrically conductive second member having a channel therethrough for conducting a coolant and disposed within said first cable near said second end;
   a flexible tubular first conductor disposed in said first cable and connected between said first member and said second member for conducting an electrical current to said tubular member and defining a passageway therein for conducting a coolant to said tubular member;
   an electrically conductive third member having a bore therethrough and disposed within said first conductor and attached to a portion of said tubular member extending through and electrically insulated from said first member;
   a first conduit disposed through said second member and electrically insulated therefrom, and disposed in said first conductor;
   an electrically conductive fourth member having a hole therethrough and attached to said first conduit;
   a flexible tubular second conductor disposed in said first conductor and attached between said third member and said fourth member for conducting an electrical current between said third member and said fourth member and for conducting a coolant therethrough; and
   an electrically insulating flexible second cable attached to said third member and to said fourth member and disposed over said second conductor for electrically insulating said second conductor from said first conductor.

2. The apparatus according to claim 1 wherein said apparatus further comprises a second conduit connected to said second member in fluid communication with said channel in said second member.

3. The apparatus according to claim 2 wherein said apparatus further comprises a fiber optic cable disposed within said coil and extending through said flexible cable means for detecting the temperature of said tube.

4. The apparatus according to claim 3 wherein said apparatus further comprises a power supply connected to said first and second conduits.

5. The apparatus according to claim 4 wherein said apparatus further comprises a pumping mechanism connected to said first and second conduits.

6. The apparatus according to claim 5 wherein the end of said fiber optic cable disposed within said coil is formed into a 45° angle tip for reflecting light along said fiber optic cable.

7. The internal heating apparatus according to claim 6 wherein said mandrel has a bore therein for allowing light to enter and impinge on said fiber optic cable.

8. The internal heating apparatus according to claim 7 wherein said coil has between approximately 5–25 turns.

9. The internal heating apparatus according to claim 8 wherein said coil has between approximately 10–12 turns.

10. The internal heating apparatus according to claim 9 wherein said power supply comprises a 20 KW RF induction heating power supply.

11. The internal heating apparatus according to claim 10 wherein said power supply further comprises a 200–400 KHz power supply.

12. The internal heating apparatus according to claim 11 wherein said fiber optic cable is a single strand quartz fiber optic cable.

13. The internal heating apparatus according to claim 12 wherein said apparatus further comprises a two color pyrometer connected to said fiber optic cable for determining the temperature of said tube.

* * * * *